United States Patent Office 2,705,227
Patented Mar. 29, 1955

2,705,227

HEAT STABILIZATION OF POLYAMIDES

Gelu Stoeff Stamatoff, Newark, Del., assignor to E. I. du Pont de Nemours and Company, Wilmington, Del., a corporation of Delaware No Drawing. Application March 15, 1954,
Serial No. 416,438

6 Claims. (Cl. 260—45.7)

This invention relates to synthetic linear polyamides, and more particularly, to the stabilization of polyamides against atmospheric degradation at elevated temperatures.

The synthetic linear polyamides prepared from polymerizable mono-amino-carboxylic acids or their amide-forming derivatives, or from suitable diamines and suitable dicarboxylic acids or amide-forming derivatives of these compounds, possess a number of physical properties such as great toughness and high tensile strength which make them of great value in many applications. The recurring intralinear carbonamide groups in the said polyamides are separated by hydrocarbon groups containing at least two carbon atoms. Preparation and use of such polymers are illustrated in U. S. Patents 2,071,250, 2,071,253, and 2,130,948. The polyamides described in these patents are high molecular weight polymers which as a class are microcrystalline in structure. In general these polyamides have intrinsic viscosities above 0.4 where intrinsic viscosity is defined as in U. S. Patent 2,130,948. They have recurring amide groups as an integral part of the main polymer chain, and are capable of being formed into filaments having structural elements oriented in the direction of the axis.

Synthetic linear polyamides when exposed to the atmosphere at elevated temperatures for fairly long periods of time undergo degradation which impairs those physical properties responsible for the toughness and flexibility characteristics of such substances. In addition, these polyamides are badly discolored by exposure to atmospheric conditions, i. e., heat and light. The resulting brittleness and discoloration are undesirable in certain applications, such as electrical insulation, transparent films, bristles, cloth, coated fabrics and the like, wherein much dependence is placed upon maximum retention of toughness, flexibility, and original color during fabrication and service.

It is an object of this invention to stabilize the said high molecular weight synthetic linear polyamides against heat degradation or embrittlement that is encountered upon exposure for prolonged periods of time to elevated temperatures, particularly under atmospheric conditions. Other objects will be apparent from the hereinafter description of the subject invention.

French Patent 906,893 relates to stabilization of synthetic linear polyamides with copper compounds. Such copper compounds include metallic copper, copper acetate, copper formate, copper carbonate, cupric sulfite, etc. U. S. Patent 2,493,597 relates to stabilization of the viscosity of polyamides by means of certain phosphite esters, or related compounds. The present invention is directed to a process of improving the stability of synthetic linear polyamides with a combination of a copper compound and an inorganic halide.

The objects of this invention are accomplished by incorporating in a synthetic linear polyamide a stabilizer composition comprising a copper compound, and a halogen compounds from the group consisting of hydrogen halide acids, alkali metal halides, alkaline-earth metal halides and ammonium halides. The copper which is employed is present in the polyamide in dissolved form. By "copper in dissolved form" is meant a copper compound which is dissolved in the polyamide, i. e. is distributed uniformly throughout the polyamide. The mechanism whereby copper becomes dissolved in polyamides may vary; for example, by milling metallic copper into a polyamide a reaction occurs with the polyamide whereby a soluble copper compound is formed. Thus while "copper in dissolved form" does not include elementary copper, it does include soluble copper derived therefrom. Also, inorganic and organic copper compounds yield complexes with diamines and/or polyamides. The term "copper in dissolved form" embraces these various complexes, no matter how produced.

More specifically, a greater improvement in the stability of a synthetic linear polyamide against embrittlement can be obtained by incorporating with the polymer a composition comprising a copper compound, a halogen compound, and a phosphorus compound from the group consisting of inorganic phosphorous acids and alkali metal salts thereof; also effective are aryl phosphites and phosphates, and aralkyl phosphites and phosphates. More particularly, the amount of chemically combined (i. e., dissolved) copper employed, expressed as percent of metallic copper by weight of polyamide, ranges from 0.001% to 0.03%; the halogen compound ranges from 0.1% to 5%, based upon the weight of polyamide, and from 0.1% to 1% of the phosphorus compound, based upon the weight of polyamide, may be employed.

The present invention resides in the discovery that the heat stability of synthetic linear polyamides stabilized with copper compounds can be increased to a surprisingly greater degree by incorporating a small quantity of halogen compound, as defined herein, into the polyamide along with the copper compound. Furthermore, the stability of these polymers can be increased to an even greater extent by using a stabilizer composition comprising a soluble copper compound, a halogen compound, and a phosphorus compound as defined herein.

A still further improvement in the compositions herein described results if a small amount of a phenolic oxidation inhibitor such as catechol is also present as one of the ingredients of the reaction mixture.

The following example, in which all parts are by weight unless otherwise specified, is illustrative of various embodiments of the present invention.

*Example 1.*—The following materials were added to a jacketed kettle in the following order with stirring:

| | Parts |
|---|---|
| Distilled water | 900 |
| Adipic acid | 1000 |
| 80% hexamethylenediamine | 1000 |

To the kettle were added 18 parts of a decolorizing carbon. The mixture was stirred for ½ hour and the pH was adjusted to 7 by suitable addition of acid or diamine. The resulting solution of hexamethylene diammonium adipate was then filtered.

A portion of the salt solution, 650 parts (equivalent to 250 parts of polymer), was concentrated by vacuum distillation, and the resulting salt solution was transferred to a glass jar. The following stabilizer composition was added to the salt solution:

| | Parts |
|---|---|
| Phosphorous acid | 0.65 |
| Copper acetate | 0.0375 |
| Potassium iodide | 2.5 |

These quantities of phosphorous acid, copper acetate, and potassium iodide, based upon the weight of polyamide, were about 0.25, 0.015, and 1.0% respectively.

The salt solution containing the above stabilizer composition was introduced into a cylindrical glass bottle which was inserted into an autoclave having an inside diameter slightly greater than the outside diameter of the bottle, and polymerization was carried out according to the following schedule:

| Operation | Time (hrs.) | Temperature, °C. |
|---|---|---|
| Heating up to 250 p. s. i. | 1 | 55–215 |
| Heat at 250 p. s. i. and bleed stream | 3¾ | 215–250 |
| Reduce pressure to 0 | 1 | 250–275 |
| Pass slow nitrogen stream to autoclave | 1 | 275 |
| Close autoclave and increase nitrogen pressure to 100 p. s. i. | | 275 |

The autoclave was cooled, and the plug of polymer in the bottle was removed by breaking the bottle. The plug of polymer was then crushed into smaller particles.

The stability of the polymer against embrittlement upon exposure at elevated temperatures was determined in accordance with the following test:

The polymer powder was dried in a mechanical convection oven at 120° C. for 4 hours. The polymer was then extruded through a screw stuffing machine into the form of a filament 0.04 inch in diameter. The filament was wrapped on numerous spools and suspended in an oven at 150° C. From time to time a specimen of filament was taken out of the oven and cooled in a desiccator. After cooling, the specimen was wrapped tightly around a wire 0.04 inch in diameter to test the flexibility of the specimen. At the beginning of the test the specimens could be wrapped around the wire thousands of times without breakage. As the time in the oven increased, breakage occurred at a successively smaller number of turns. Finally the specimen broke when an average of only a few turns was made. When the filament broke before it could be wrapped around the wire 5 times in 50% of the trials, the time in the oven at 150° C., expressed in hours, was the measure of heat stability. For example, the heat stability of the polymer of this example was about 2,000 hours.

In addition to the measure of heat stability in the presence of air at 150° C., another test is used to measure heat stability in the presence of pure oxygen at a temperature of 105° C. This test comprises heating a coil of filament about 0.040 inch in diameter at a temperature of 105° C. in an atmosphere of pure oxygen. From time to time, as in the above-described test, specimens of the filament are cooled in a desiccator and wrapped in the form of a tight coil around a wire having a diameter of 0.040 inch in order to measure the flexibility of the filament. At the point of breakage (less than 5 turns) the time of exposure to oxygen at 105° C. is recorded, and this represents the stability of the polyamide under oxidizing conditions. For example, the polymer of this example had a stability of over 8,000 hours.

The above test in an atmosphere of pure oxygen is believed to simulate oxidation under atmospheric conditions. Since it is believed that embrittlement is mainly caused by oxidation, this test has been carried out on the polymer samples in addition to measuring the stability of polymer in air at 150° C.

The following table illustrates the heat stability of a synthetic linear polyamide stabilized with various compositions within the scope of the present invention. These compositions were added to the polyamide salt as illustrated in Example 1, and polymerization was carried out in the manner described in that example.

*Table.—Effect of additive on heat stability of polyamides*

| Additive | | | Heat Stability | |
|---|---|---|---|---|
| Copper Acetate (Cu(C₂H₃O₂)₂) percent by weight of polyamide (Polyhexamethylenediamine polyadipamide) | Halogen Compound and percent by weight of polyamide | Phosphorus Compound and percent by weight of polyamide | 150° C. in air-hours | 105° C. in oxygen-hours |
| 0 | | 0 | 0 | 2 | 2 |
| 0 | | 0 | H₃PO₃ ......... 0.25 | 2 | 2 |
| 0 | | 0 | NaH₂PO₄ ..... 0.25 | 2 | 2 |
| 0.15 | | 0 | | 200 | 2 |
| 0 | KI ...... 1 | | 0 | 130 | |
| 0.15 | NH₄I ... 0.5 | | 0 | 590 | |
| 0.15 | KI ...... 0.25 | H₃PO₃ ......... 0.25 | 500 | 1,525 |
| 0.15 | KI ...... 1 | H₃PO₃ ......... 0.25 | 2,050 | 8,000+ |
| 0.3 | KI ...... 0.25 | H₃PO₃ ......... 0.25 | 820 | 8,000+ |
| 0.15 | NaCl ... 0.25 | H₃PO₃ ......... 0.25 | 820 | less than 96 |
| 0.15 | NaCl ... 1 | H₃PO₃ ......... 0.25 | 1,180 | 8,000+ |
| 0.03 | NaCl ... 1 | H₃PO₃ ......... 0.25 | 1,180 | 8,000+ |
| 0.15 | KBr .... 1 | H₃PO₃ ......... 0.25 | 1,350 | 8,000+ |
| 0.015 | KBr .... 2 | H₃PO₃ ......... 0.25 | 1,410 | 1,000 |
| 0.02 | MgCl₂ .. 1 | H₃PO₃ ......... 0.25 | 600 | |
| 0.015 | KI ...... 2 | H₃PO₃ ......... 0.25 | 1,700 | |
| 0.015 | KI ...... 1 | | 0 | 1,350 | |
| 0.015 | KI ...... 2 | | 0 | 1,350 | |
| 0.03 | KI ...... 1 | | 0 | 1,350 | |
| 0.03 | KI ...... 2 | | 0 | 1,250 | |
| 0.015 | NaCl ... 1 | | 0 | 480 | |
| 0.03 | NaCl ... 2 | | 0 | 480 | |
| 0.03 | NaCl ... 1 | NaH₂PO₄ ..... 0.25 | 1,430 | 2,000+ |
| 0.015 | NaCl ... 2 | NaH₂PO₄ ..... 0.25 | 1,000 | 2,000+ |
| 0.015 | NaBr ... 1 | NaH₂PO₄ ..... 0.25 | 1,500 | 2,000+ |
| 0.03 | KI ...... 1 | NaH₂PO₄ ..... 0.25 | 3,500 | 3,300 |
| 0.03 | KBr .... 1 | NaH₂PO₄ ..... 0.25 | 2,400 | 2,000+ |
| 0.015 | KI ...... 2 | NaH₂PO₄ ..... 0.25 | 3,100 | |
| 0.03 | KI ...... 1 | Na₃PO₄ ........ 0.25 | 2,000+ | |
| 0.015 | KI ...... 1 | H₃PO₄ ......... 0.25 | 2,100 | 5,000+ |
| 0.015 | KBr .... 1 | H₃PO₄ ......... 0.25 | 1,550 | |
| 0.015 | NaCl ... 1 | H₃PO₄ ......... 0.25 | 1,800 | |
| 0.015 | {KI ...... 0.5 / KBr .... 0.5} | H₃PO₃ ......... 0.25 | 3,200 | |
| 0.015 | {KBr .... 1 / KI ...... 1} | H₃PO₃ ......... 0.25 | 3,300 | |
| 0.015 | KI ...... 0.5 | H₃PO₃ ......... 0.25 | 1,800 | |
| 0.015 | KI ...... 0.75 | H₃PO₃ ......... 0.25 | 2,500 | |
| 0.03 | KI ...... 2.0 | NaH₂PO₄ ..... 0.25 | 3,600 | |
| 0.03 | KI ...... 1.0 | Na phenylphosphinate. 0.25 | 1,600 | |

*Example 2.*—Comparative experiments were made with polycaprolactam-covered wire inhibited as described below. In some of the tests the polycaprolactam contained about 0.05% of copper as copper stearate, and 1% of catechol, these ingredients being mixed in an extrusion apparatus prior to extrusion on the wire. In other tests the ingredients were added during polymerization in a stainless steel autoclave, and the extrusion on wire was accomplished without a preliminary extrusion-mixing operation. The products obtained by the latter process were badly and non-uniformly discolored. The products made by the extrusion-mixing technique were of light uniform color. Similar tests were made with the same resin inhibited with a mixed inhibitor consisting of 0.015% copper acetate, 1.0% potassium bromide, 0.25% of mono-sodium phosphate and 1% catechol. The coating on the wire thus obtained was colorless and stable, even when the inhibitors were added in the autoclave, i. e. polymerization, step. Accordingly, with this mixed inhibitor the extrusion capacity required (extrusion equipment being a costly item) was less than with the copper salt-catechol inhibitor.

It is to be understood that the foregoing examples are merely illustrative and that the present invention broadly comprises stabilizing synthetic linear polyamides against embrittlement upon exposure to atmospheric conditions with a composition comprising a soluble copper compound and a halogen compound as defined herein. More particularly, the synthetic linear polyamides are stabilized with a composition comprising a soluble copper compound, a halogen compound, and a phosphorus compound as defined herein.

The stabilizer compositions of the present invention are added preferably to the polyamide salt prior to the condensation reaction, which is preferably carried out at a temperature of 200° to 285° C., in a pressure-resistant vessel while bleeding (i. e. gradually releasing) therefrom the steam produced chemically from the condensation reaction. From the viewpoint of commercial operation this is the most efficient embodiment of the invention. However, the stabilizer composition may be added to the condensing reactants at any time during the condensation. Addition of the stabilizer to the molten polymer followed by homogenization by extrusion is also within the scope of the present invention. Blending of the stabilizer with solid particles of polyamide, i. e., molding powder, in a tumbler followed by extrusion of the solid particles is also a satisfactory method of incorporating stabilizer into polyamide.

Included with the soluble copper compounds are the cuprous and cupric salts of an organic or inorganic acid, and also the copper compounds which are formed when metallic copper and copper oxides are added to the polyamide, or to the polyamide-forming reactants. What is required is that the copper compound be soluble in the polyamide, copper salts of alkanoic acids such as acetic, butyric, lauric, palmitic and stearic acids being preferred.

Sodium and potassium bromide and iodide are the preferred halogen compounds for use in the present stabilizer compositions. Greater stability is obtained with a given quantity of the alkali metal bromides and iodides than with alkali metal chlorides. In general, a greater quantity of the alkali metal chloride is required to obtain optimum stabilization. Other halogen compounds which are included within the scope of the present invention are hydrogen halide acids, such as hydrochloric, hydrobromic, and hydriodic acids; alkaline-earth metal halides such as magnesium chloride; and ammonium halides such as ammonium chloride, bromide, and iodide. It is to be understood that halogen compounds containing fluorine are not included within the scope of the present invention.

Phosphorous acid is the preferred phosphorus compound for the present stabilizer compositions, however, phosphoric acid may also be used. In the absence of other stabilizers, phosphorous acid and alkali metal dehydrogen phosphates, while stabilizing the intrinsic viscosity of the polymers, fail to stabilize the polymers against embrittlement due to ageing in the presence of air. Furthermore, various other phosphorous and phosphoric compounds which are readily hydrolyzable to the acids may be used in the practice of this invention. Particular compounds which have been found to be effective include sodium phosphites and phosphates; various alkyl phosphites and phosphates such as methyl, ethyl, propyl, and butyl phosphites and phosphates; various aryl phosphites and phosphates such as triphenyl phosphite and phosphate; alkali metal aryl phosphinates and various cycloalkyl and aralkyl phosphites and phosphates.

In addition to the stabilizing action of the phosphorous compounds of the present invention it has been found that those phosphorus compounds defined herein act as catalysts in the polymerization of polyamides. This means that under comparable conditions of polymerization the viscosity of the resulting polyamide will be higher when polymerized in the presence of the herein defined phosphorus compounds than when polymerized in the absence thereof. For example, a polyhexamethylene adipamide polymerized in the presence of 0.25% of phosphorous acid, based upon the weight of polyamide, had a viscosity of 1.30, while the same polyamide polymerized in the absence of phosphorous acid at a viscosity of 1.10. Consequently, when a phosphorus compound is present in the stabilizing composition, it is necessary to reduce the duration of condensation in order to obtain a polymer having a particular viscosity, or a viscosity stabilizer such as acetic acid may be used. Such reductions in the duration of polymerization have an inherent tendency to improve the color stability of the resulting polymer.

Only relatively minor quantities of each of the components of the stabilizer compositions of the present invention are required for good results. The amount of dissolved copper compound, expressed in terms of percent of metallic copper by weight of polyamide, is usually between 0.001% and 0.03%. It is preferred to employ between 0.005% and 0.01%. The amount of halogen compound, based upon the weight of polyamide, is usually between 0.1% and 5%, 1% to 2% being preferred. From 0.1% to 1% of the phosphorus compound, based upon the weight of polyamide, is usually used, and about 0.1 to 0.5% is preferred. It is within the scope of the present invention to use quantities of all components of the present stabilizer compositions outside of the ranges herein specified; but experience has shown that amounts substantially less than the minimum quantities are usually ineffectual, and quantities above the maximum amounts result in no further improvement in the polymer. Furthermore, excessive quantities of the phosphorus compounds cause bubbling of the polyamide compositions during molding operations.

Synthetic linear polyamides which can be stabilized according to the process of this invention are all those of the nylon type having an intrinsic viscosity above 0.4 as defined in U. S. Patent 2,130,948. Furthermore, polyamides formed by reaction of a dicarboxylic acid and a stereoisomeric mixture of di(p-aminocyclohexyl)methane as embodied in U. S. Patent 2,512,606 are also included within the scope of the present invention. Particular polyamides included among these which may be stabilized by the stabilizers of this invention are as follows: polyhexamethylene adipamide, polyhexamethylene sebacamide, polymerized 6-aminocaproic acid, polytetramethylene sebacamide, polytetramethylene adipamide, and polyadipamides prepared from di(p-aminocyclohexyl)ethane or 1,6-di(p-aminocyclohexyl)hexane as the diamine component. It is to be understood that interpolyamides prepared from mixtures of amino acids and dibasic acids and diamines as embodied in U. S. Patent 2,285,009 are also included within the scope of this invention. For purposes of this invention those polyamides in which recurring carbonamide groups are chemically modified after polymerization, e. g. by substitution of —H by —CH$_2$O-alkyl, are not included.

Polyamide compositions stabilized with the present stabilizers are initially white in color. This is in contrast to polymers stabilized with soluble copper compounds alone, these polymers being highly colored depending upon the type and concentration of the copper compound employed. However, in general, the stabilized polyamide compositions of this invention discolor somewhat upon being exposed to elevated temperatures, although particular stabilizer compositions illustrated in the foregoing table impart fairly good color stability. For example, polyhexamethylene adipamide stabilized with 0.015% of copper acetate, 0.25% of monosodium phosphate, and 2% of potassium bromide has fairly good color stability.

The compositions of this invention may be modified by the addition of other materials. Suitable modifying agents include plasticizers, resins, waxes, fillers and certain pigments. The form and use of the polyamide will determine which of these modifying agents are the more suitable.

The improved polyamides of this invention can be converted into any of the forms suitable for polyamides generally, such as yarns, tire cord, bristles, fabric, molded articles, films, and coatings, for example, for filaments, textiles, wood, rubber, leather, and ceramic materials, and are particularly useful in the above forms when intended to be exposed to elevated temperatures. Thus they form especially valuable textile fabrics by reason of their stability toward the high temperatures encountered in laundering, calendering, and ironing operations. By reason of their excellent durability, the compositions of the invention are especially useful also, for electrical insulation, for example as coating for magnet wires, electric blasting cap leading wires, and slot insulation for motors, movie film, sausage casing, and as coatings on materials which are exposed to elevated temperatures.

This application is a continuation-in-part of my copending U. S. application S. N. 250,027, filed October 5, 1951, which in turn is a continuation-in-part of my U. S. application S. N. 219,115, filed April 3, 1951, now abandoned.

I claim:

1. A synthetic linear polycarbonamide, having recurring intralinear carbonamide groups as an integral part of the main polymer chain, which is stabilized against degradative effects of heat, oxygen and atmospheric conditions by the addition of 0.001% to 0.03% by weight of copper dissolved in said polycarbonamide, and a minor quantity not exceeding 5% by weight of a stability-enhancing halogen compound of the class consisting of sodium, potassium, magnesium, and ammonium chlorides, bromides and iodides, said recurring intralinear carbonamide groups being separated by hydrocarbon groups containing at least two carbon atoms.

2. A synthetic linear polycarbonamide, having recurring intralinear carbonamide groups as an integral part of the main polymer chain, which is stabilized against degradative effects of heat and oxygen by the addition of 0.001% to 0.03% by weight of copper dissolved in said polycarbonamide, from 0.1 to 5% by weight of a halogen compound of the class consisting of sodium, potassium, magnesium, and ammonium chlorides, bromides and iodides, and from 0.1 to 1% by weight of a phosphorus compound of the class consisting of phosphorus acids and alkali metal salts thereof, said recurring intralinear carbonamide groups being separated by hydrocarbon groups containing at least two carbon atoms.

3. Polyhexamethylene adipamide which is stabilized against degradative effects of heat and oxygen by the addition of 0.001% to 0.03% by weight of copper dissolved in the said polyadipamide, and from 0.1 to 5% by weight of a halogen compound of the class consisting of sodium, potassium, magnesium, and ammonium chlorides, bromides and iodides.

4. Polyhexamethylene adipamide which is stabilized against degradative effects of heat and oxygen by the addition of 0.001% to 0.03% by weight of copper dissolved in the said polyadipamide from 0.1 to 5% by weight of a halogen compound of the class consisting of sodium, potassium, magnesium, and ammonium chlorides, bromides and iodides, and from 0.1 to 1% by weight of a phosphorus compound of the class consisting of phosphorus acids and alkali metal salts thereof.

5. The method for stabilizing polyhexamethylene adipamide against the degradative effects of heat and oxygen which comprises admixing with hexamethylene diammonium adipate a stabilizer composition comprising $NaH_2PO_4$, a copper salt of an alkanoic acid, and an alkali metal halide in which the halogen has an atomic weight greater than that of fluorine, and thereafter heating the resulting mixture at a temperature of from 200° to 285° C. in a pressure resistant vessel while bleeding therefrom the steam which is produced from the resulting condensation reaction, whereby a sabilized molten polyamide is obtained, the quantity of $NaH_2PO_4$, chemically combined copper, and alkali metal halide being 0.1 to 0.5%, 0.005 to 0.01% and 1 to 2% of the weight of the polyamide.

6. The method of claim 5 wherein the copper salt is copper acetate and the alkali metal halide is potassium iodide.

No references cited.